Nov. 21, 1961 W. FOELKEL ET AL 3,009,705

MECHANISM FOR THE PRESELECTION OF GRAMOPHONE RECORDS

Filed Oct. 10, 1958 5 Sheets-Sheet 1

Inventors
WILHELM FOELKEL &
FRIEDEL HORSTMANN
BY: Arthur O. Klein
ATTORNEY

MECHANISM FOR THE PRESELECTION OF GRAMOPHONE RECORDS

Inventors
WILHELM FOELKEL &
FRIEDEL HORSTMANN
BY:
Arthur O. Klein
ATTORNEY

Nov. 21, 1961 W. FOELKEL ET AL 3,009,705

MECHANISM FOR THE PRESELECTION OF GRAMOPHONE RECORDS

Filed Oct. 10, 1958 5 Sheets-Sheet 3

Inventors
WILHELM FOELKEL
FRIEDEL HORSTMANN
BY:
ATTORNEY Arthur O. Klein

MECHANISM FOR THE PRESELECTION OF GRAMOPHONE RECORDS

Filed Oct. 10, 1958 5 Sheets-Sheet 4

Inventors
WILHELM FOELKEL
FRIEDEL HORSTMANN
BY:
ATTORNEY Arthur O. Klein

MECHANISM FOR THE PRESELECTION OF GRAMOPHONE RECORDS

Filed Oct. 10, 1958

Inventors
WILHELM FOELKEL &
FRIEDEL HORSTMANN
BY:
ATTORNEY Arthur O. Klein

United States Patent Office 3,009,705
Patented Nov. 21, 1961

3,009,705

MECHANISM FOR THE PRESELECTION OF GRAMOPHONE RECORDS

Wilhelm Foelkel, Ahle, near Bunde, and Friedel Horstmann, Dankersen, Kreis Minden, Germany, assignors to Wilhelm Harting, Westphalia, Germany, a firm of Germany Filed Oct. 10, 1958, Ser. No. 766,557
Claims priority, application Germany Oct. 10, 1957
15 Claims. (Cl. 274—10)

This invention relates to a mechanism for the preselection of gramophone records, principally for application to juke boxes and like automatic record playing machines. In the construction of such preselector equipment various problems arise which require some consideration to permit the scope of the present invention to be the more readily understood.

In the first place the information represented by the selection of a particular record must in some way be stored. The presence of storage facilities permits a major number of pieces of music to be selected in rapid succession for subsequent consecutive reproduction without the automatic record playing machine requiring any further attention. The reproduction of the preselected records will not necessarily be in the sequence of their preselection. Storage facilities are needed in any event. The storage elements may take the form, for instance, of mechanical levers which are tiltably displaced from one position of rest into another position of rest, or they may be buttons pushed from one position in which they are frictionally held, into another position in which they are likewise frictionally held. It is elements of such a kind that are at present known to and used in the art.

The necessary number of storage elements will naturally depend upon the number of records the magazine of the record player will hold. In other words, two storage elements will be required for each individual disc, one for the record cut on one or its faces and the other for the record cut on the other. The storage lever or button operates by causing the automatic mechanism to extract the required disc and to present the selected side of the disc to the sound head and simultaneously therewith, the relative storage element is restored to its inoperative position of rest by the automatic mechanism. The storage elements as such form no part of the present invention.

The present invention primarily relates to the mechanism which cooperates with the selector elements located on the outside of the storage elements of the machine. This mechanism which forms part of my invention causes the relative storage elements to move from one of the afore-described positions of rest into the other position of rest. This mechanism shall hereinafter be briefly referred to as the "preselector mechanism" whereas the aggregate of the storage elements hereinbefore mentioned shall be referred to as the "storage mechanism."

A very simple preselector mechanism would comprise, for instance a solenoid with a plunger behind each pin of the storage mechanism, each solenoid being connected by its own separate circuit with a selector key. In such an arrangement the elements of the storage mechanism, the solenoids, the circuits, and the selector keys, would all have to be provided in equal number. It will be readily understood that, in a juke-box containing possibly a selection of 200 records, the expenditure in preselector means would be very considerable, apart from the fact that a keyboard comprising 200 keys would be both inconvenient to operate and very cumbersome.

A method of reducing the number of keys comprises for instance, abandoning the unique coordination of each individual record with the depression of a specific key and replacing the aforesaid coordination in favour of the coordination of each record with a given combination of two keys. The selection of say 200 records may then be performed with the help of a keyboard comprising only 30 keys subdivided into a group of ten and a second group of 20. Such an arrangement will then permit combinations to be formed of a key in one group with a key in the other. The number of keys will thus be reduced, but the number of solenoids and the number of circuits would still have to be equal to the number of possible selections that can be made, i.e. in the contemplated case 200, so that the expenditure in preselector means will nevertheless be still considerable. Moreover, the necessity of having so many circuits will also render impracticable any arrangement for selection by remote control, since the communicating cable would have to incorporate something like 200 conductors. However, there are possibilities of reducing the number of conductors to roughly the number of keys, i.e. in the present case to about 30. Yet the number of solenoids in this arrangement would still be 200.

The greater the number of selectable records the more urgent becomes the need of reducing the number of solenoids in the selector mechanism to within reasonable limits. A possible solution comprises an arrangement wherein instead of the depression of one or more of the keys causes one of 200 solenoid plungers to operate, the depression of any one or more of the keys will cause the operation of an only solenoid in the system. This single solenoid or a rod linkage associated therewith, however, will first have to be traversed into a position which corresponds with the combination of keys that has been selected. In the last described arrangement the technological problem will then consist in providing means whereby the depression of a given combination of keys will operate an electro-mechanical mechanism which traverses the solenoid plunger or the associated rod linkage until the solenoid plunger is in register with the appropriate storage element before the impulse is injected into this single solenoid plunger. This may be achieved, for instance, by having the keys, when depressed activate a pulse generator for the generation of a pulse train characteristic of the selected group of keys. The pulse generator may then be arranged to energise a stepping mechanism which traverses the solenoid or its associated lever linkage into register with the desired storage element, the solenoid not being energised and storage effected until the described operation has been completed. An arrangement of this kind is already known to the art, but the employment of a pulse generator considerably complicates the construction of the selector mechanism.

A greatly simplified solution for the construction of the selector mechanism consists in first moving the selecting solenoid or lever linkage into alignment with the desired storage element by hand with the help of suitable purely mechanical transmission means, and in then generating the pulse for energising the solenoid. However, this mode of operation, which is incidentally also already known to the art, abandons the convenience of pure keyboard control.

Another known device is an exploring device which is rigidly attached to the record magazine and which serves to detect and identify a pin which has been pushed forward from a pin selector disc. The exploring device on the record magazine may be combined with a cancelling device for restoring the displaced pin in the selector disc to its former position as soon as the selected record has been withdrawn from the magazine.

The present invention relates to an improved system of pre-selection which offers the following specific advantages:

(*a*) Straight keyboard control is retained. The number of keys is not equal to the possible number of selections but substantially less, say 30 keys for the selection of any of 200 record.

(*b*) The number of electrical conductors required for effecting a selection from say 200 pieces of music is likewise small, for instance not more than 20.

(*c*) The number of selecting solenoids is also considerably reduced.

(*d*) In addition to the advantages enumerated from (*a*) to (*c*), which may incidentally also be secured by the aforementioned system in which the plunger element is traversed into alignment with one of 200 storage elements, the proposed system dispenses with the pulse generator which is required in the afore-described system. The selector mechanism proposed by the present invention has the further advantage of not requiring the plunger element to be traversed across all of the, say, 200 storage elements, an operation which takes considerable time to perform but merely requires a plunger carrying disc to swing through a relatively small angle. The mechanism of the present invention as hereinbefore described, requires a stepping and traversing mechanism capable of working at very high speeds as well as with great precision in establishing register with the required storage element.

In view thereof it is a general object of the present invention to simplify the construction and arrangement of the pre-selector mechanism of an automatic record playing machine. It is a further more specific object of the present invention to provide a pre-selector mechanism for gramophone records which has the following several advantages:

(1) A keyboard with far fewer keys than storage elements, (2) A number of conductors likewise substantially smaller than the number of storage elements, (3) A number of solenoids also substantially smaller than the number of storage elements, (4) No impulse generator and no stepping mechanism required, (5) High-speed pre-selection.

With the above objects in view the invention mainly consists of three separate assemblies mounted in serial succession on a common shaft, namely (*a*) A magazine for holding disc records, freely rotatably mounted on said shaft and adapted to be rotated by a motor, (*b*) A selector pin disc affixed to said shaft and provided with tappet elements or pins movably located in holes disposed in concentric circular banks in such manner as to project in inoperative position from that side of the disc which faces away from the magazine position, but adapted to be pushed slidably back by thrust means so as to project from the other side of the disc, (*c*) A magnetic plunger disc rotatably reciprocable on said shaft by drive means rigidly connected with the selector pin disc, and provided with magnetically operable plungers which serve to push back the selector pins.

In a preferred arrangment the selector pin disc may be provided at diametrically opposite locations with magnetically operable stop elements of which the stop faces are partly recessed, said stop elements being slidably movable radially of the disc by the action with respect to solenoids. Moreover, the plunger disc may be arranged to carry a plurality of magnetically operable push plungers disposed in circular concentric arrangement in such manner that the diameter of the pitch circle of said bank of push plungers is equal to the diameter of the circular bank of selector pins, if only one such bank is provided on the selector pin disc, or in the event of the selector pin disc carrying two circular banks of selector pins, equal to half the sum of the diameters of the two pitch circles of said two circular banks of selector pins. Preferably, the magnetic plunger disc carries a plurality of magnetically operable position control plungers adapted to cooperate with the stop faces of the magnetically operable slidable stop elements on the selector pin disc. Another feature of the invention is the provision of an electric motor for driving the magnetic plunger disc, said motor being adapted rotatably to reciprocate the magnetic plunger disc by means of a crank disc and a flexibly yieldable connecting rod.

The invention further includes a detecting and cancelling mechanism. The latter comprises a tiltable switch lever pivotally mounted on a pin affixed to the magazine and carried around by the rotating magazine. The switch lever is provided at one of its ends with two levers which are rigid in the tilting plane of the switch lever and which face the circular bank of selector pins on the selector pin disc, whereas the other end of the switch lever cooperates with a switch. The two levers which are rigid in the tilting plane of the switch lever are deflectable against a spring load in a plane normal to the tilting plane of the switch lever. One of the two levers mounted on one end of the tilting switch lever may have a detecting contact face which will be intercepted by a selector pin projecting from the selector pin disc when the magazine revolves, whereas it will yield when the magazine revolves in reverse. The other of the two levers may have a face which, upon being thrust forward, will strike a projecting selector pin with which it aligns and restore the same to its inoperative position. The forward thrust may be conveniently imparted thereto by the plunger of a solenoid. Normally, the tilting switch lever may be urged by a spring into contact with a stop in such manner that the face of the detecting lever will be advanced in the direction of rotation of the magazine and, upon coming into contact with a projecting selector pin, yield and thus deflect the tilting switch lever against the pull of its spring. Preferably the tilting switch lever will close the cooperating switch only within a narrow angular range of deflection and swing freely on its pivot on either side of this switch-closing position. One end of the tilting switch lever preferably carries a roller which is adapted to ride on to a cam affixed to one of the contact springs of the switch, the contour of said cam comprising a hump. The switch controlled by the switch lever may operate a relay for disconnecting the source of power from the motor which drives the magazine and for applying a D.C. braking potential thereto, and the relay may simultaneously control the operation of the mechanism which extracts the selected records from the magazine.

The novel features which are considered as characteristic for the invention are set forth in particular in the appended claims. The invention itself, however, both as to its construction and its method of operation, together with objects and advantages thereof, will best be understood from the following description of specific embodiments when read in connection with the accompanying drawings, in which:

Figures 4, 5:
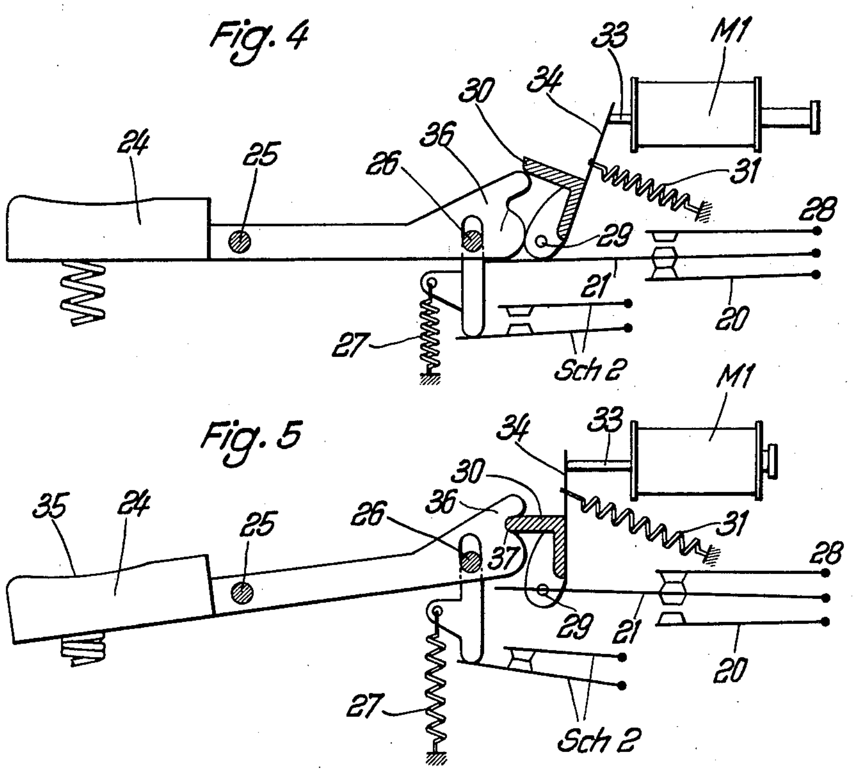
Figure 7:
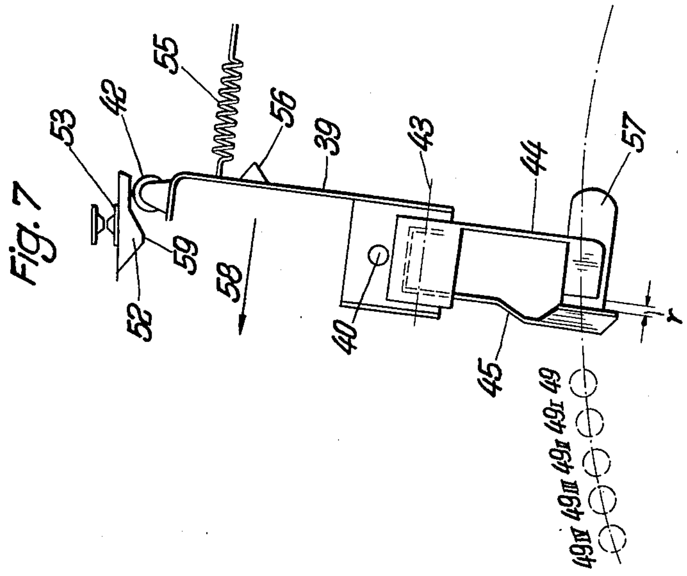
Figure 6:
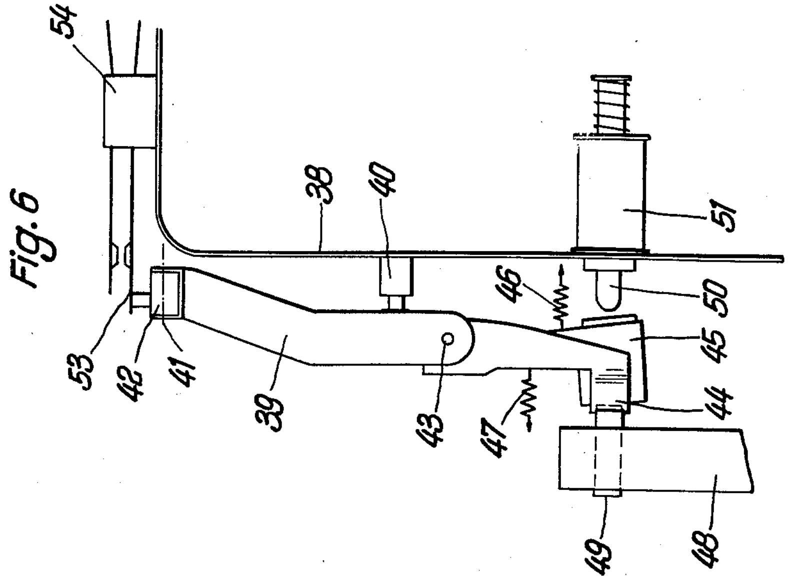

FIG. 4 is a diagrammatic side elevation of a selector key in inoperative position, FIG. 5 is a side elevation of the same key when depressed and arrested, FIG. 6 is a side view of the detecting and cancelling mechanism according to the invention, and FIG. 7 is the detecting and cancelling mechanism, seen from above, after the selector pin disc has been removed. The trace of a selector pin 49—49''' is indicated by dotted lines.

Figure 1:
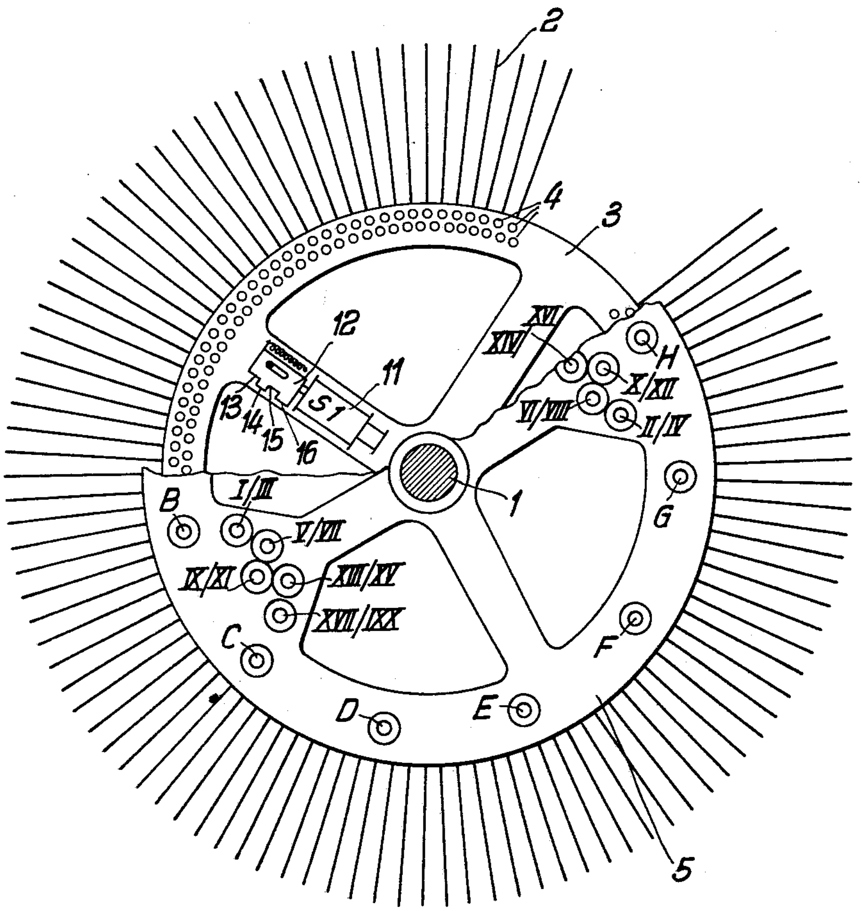
FIG. 1 is a schematic plan view of the selector mechanism.

Referring now specifically to the drawings there is shown in FIG. 1 three separate assemblies are mounted, the one behind the other, on a common shaft 1. The first of these assemblies is a record magazine 2 schematically represented by radial rays. This is loosely mounted on the shaft and can be rotated by a motor not specially shown. Rigidly affixed to shaft 1 is a selector pin disc 3 fitted with a plurality of pins, schematically represented by small circles 4, said pins in their normal positions being understood to project upwards from the plane of the paper. However, the pins are adapted to be pushed down through the holes in the disc until intercepted by stop means in such manner that they will then project from the back of the disc where they can be detected by a feeler device rigidly connected with the revolving magazine 2.

In front of the stationary selector pin disc is a magnetic plunger disc 5 which is rotatably reciprocable about shaft 1 by drive means on the pin selector disc 3. The angular stroke of reciprocation is limited to the angular distance between, i.e. the pitch of, the plungers indicated by A, B, C . . . K, or it may slightly exceed it. These magnetic push plungers are located on the perimeter of a circle which lies exactly half way between the pitch circles defined by the positions of the two banks of selector pins on the selector disc 3.

Figure 2:
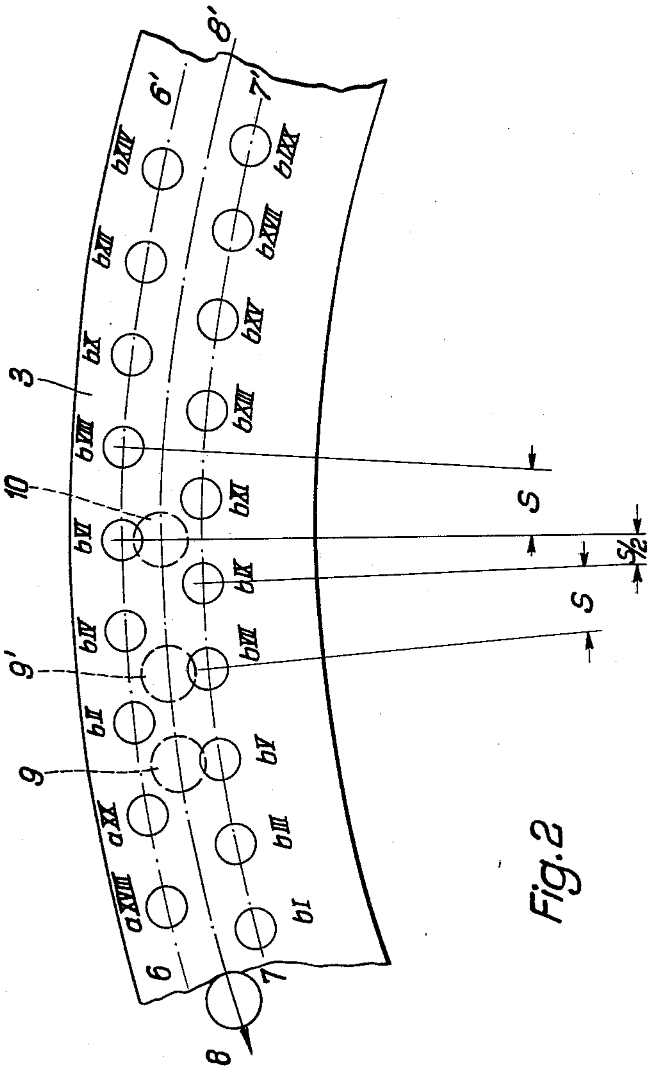
FIG. 2 is a detail of the selector pin disc, shown on a larger scale.

In FIG. 2 the section of arc 6—6′ represents part of the pitch circle of the outer bank of selector pins on the selector disc 3, said pins being coordinated for instance with the top faces of the selectable gramophone records, whereas the section of arc 7—7′ represents part of the pitch circle of the inside bank of selector pins conformably coordinated with the back faces of the records in magazine 2. The section of arc 8—8′ between the pitch circles of the two banks of selector pins represents the trace of one of a plurality of magnetically operable push plungers A, B, C . . . K on the rotatably reciprocable magnetic plunger disc 5. By reference to FIG. 2 it will be immediately clear that when the magnetic plunger disc is rotated to point 9 in the drawing and stopped in this position, and assuming that plunger B at this point is magnetically operated and thus propelled, a pin on the inside bank, namely that shown at *b*V, will be pushed through the pin selector disc 3 so as to project from the back of the disc. On the other hand, if the rotary movement of the magnetic plunger disc is intercepted at point 10, then the operation of the magnetic push plunger will affect pin *b*VI and cause this latter pin to be projected from the back of the selector disc 3.

It will thus be readily understood that by controlling the angular movement of the magnetic plunger disc 5 in relation to the fixed pin selector disc 3 a magnetic push plunger located on circle 8—8′ can be made to operate any desired pin on selector disc 3. For the sake of convenience for instance ten magnetically operable push plungers are equidistantly disposed around the circumference of the magnetic plunger disc 5 so that for the selection of a given pin on disc 3 the magnetic plunger disc 5 need merely be rotated through a limited angle and one of the ten plungers A . . . K be operated. This arrangement appreciably reduces the time required for giving effect to a selection.

In addition to the described magnetic push plungers the magnetic plunger disc 5 carries 10 magnetically operable position control plungers which are indicated by twin Roman numerals I/III, II/IV, V/VII, VI/VIII. These ten position control plungers are divided into two groups of five which are located at diametrically opposite points on the disc. One group comprises the odd and the other the even numerals of the series I to XX.

The selector pin disc 3 carries two magnetically operable slidably displaceable stop elements, likewise at opposite ends of a diameter, of which only one, indicated by S1, is visible in the drawing. Each magnetic stop consists of a solenoid 11 and a plunger with a head portion 12 representing the stop proper provided with rectangular recesses 13 and 15. These magnetically controlled stops are so located that the rectangular recesses 13 and 15 in the stop 12 are respectively associated with the two pitch circles of the position control plungers (i.e. the outer bank comprising plungers I/III, IX/XI, XVII/XIX and II/IV, X/XII, XVIII/XX, and the inner bank comprising plungers V/VII, XIII/XV and XIV/XVI respectively) in such manner that a projecting plunger in the outer bank of position control solenoids will be intercepted either by the base of recess 13 or the projecting face 14 of stop 12 and a projecting plunger in the inner bank of position control solenoids will be intercepted by the base of recess 15 or the projecting face 16, according to whether solenoid 11 has been energized or not. It will therefore be understood that in the position of stop elements S1 illustrated in FIG. 1 a projecting plunger comprised in the outer bank, i.e. I/III, IX/XI or XVII/IXX would be intercepted by the base of recess 13 when the magnetic plunger disc 5 is rotated in clockwise direction, whereas a projecting plunger of the inner bank V/VII, XIII/XV would be intercepted by the base of the other recess 15. However, if solenoid 11 had been energized and stop 12 radially outwardly displaced, a plunger comprised in the outer bank would be intercepted by the projecting face 14 and a plunger of the inner bank by projecting face 16.

It will therefore be appreciated that the combination of five magnetic position control plungers and a magnetic stop will permit one of the pin selecting magnetic push plungers to be stopped in ten different positions, for instance for the selection of pieces of music recorded on the back faces of ten records, and since a similar arrangement is provided on the diametrically opposite side of the magnetic plunger disc 5 and of the selector pin disc 3 the magnetic plunger disc 5 can be stopped in altogether twenty different positions. The last of the ten position control plungers, that is to say the plunger marked XVII/XX (not shown), need not be magnetically operable and may be embodied in a fixed stop. Since in the illustrated example it is assumed that there are ten magnetic push plungers A . . . K on the magnetic plunger disc 5 the provision of nineteen magnetic plungers and one fixed stop and of two magnetically operable stops is sufficient to control two hundred possible selections. This is also the total number of selector pins on the selector pin disc 3.

By employing magnetic position control plungers located on a circle of comparatively large radius it is possible to reproduce well defined angular positions of the push plungers without an undue expenditure in means, so that a mechanism of this kind is very robust and solid. The additional employment of magnetically operable stops provides, as it were, a further resolution of the fine structure of angular position control.

Figure 3:
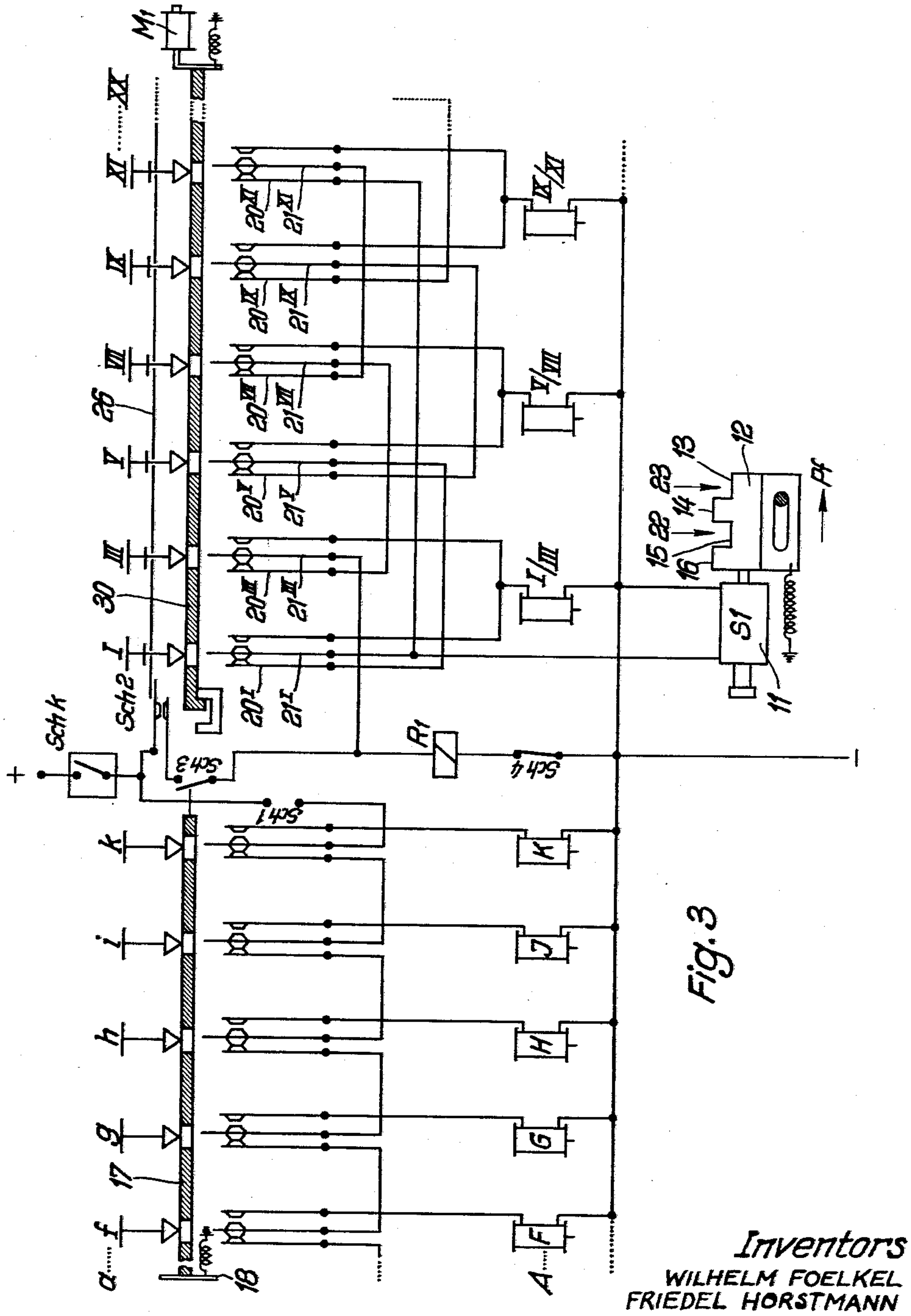
FIG. 3 is part of the basic wiring diagram of the selector mechanism.

FIG. 3 illustrates a schematic wiring diagram of the mechanism. On the left hand side the keyboard for ten magnetically controlled push plungers A . . . K of which five are shown in the drawing is schematically illustrated. The right hand side represents a group of selector keys, I to XX of which only six are shown in the drawing, for controlling the ten magnetic position control plungers of which only three are actually shown, and the two magnetic stops S1 and S2 of which only stop S1 is shown. The push plungers A . . . K are selectively operated by the depression of the schematically indicated keys *a* . . . *k* when switch S*ch* 1 is closed. A spring-loaded arrester rail 17 with spring 18 retains the actuated key in depressed position. However, this locking device is releasable at the end of the process of selection by means not specially shown or when another key of this group is subsequently depressed.

The depression of one of the keys I . . . XX on the right hand side controls the position-control magnets and the magnetic stops S1 and S2 in corresponding sequence. The keys act on a common rail 26 in such manner that the depression of any one of the keys closes a switch S*ch*2 for operating a relay R1 which energises an arrester solenoid M1 as well as the motor for imparting the required reciprocating rotary motion to the magnetic plunger disc 5 in FIG. 1. This motor is not specially shown in the drawing. As soon as switch *Sch* K has been closed by the insertion of a coin and a key in group *a* . . . *k* on the left has been depressed, causing switch *Sch*3 to close, the further depression of a numbered key will energize the interconnected circuit system of keyboard I . . . XX and, assuming the centre springs 21 I, 21 III, 21 V . . . remain in contact with the contact springs 20 I, 20 III, 20 V . . . on the left, solenoid 11 of the magnetic stop S1 will likewise be energized. Stop 12 will therefore shift from the illustrated position until the two arrows 22 and 23 which symbolise the paths of the arriving position control plungers point towards the rectangularly projecting faces 14 and 16 of the stop. Assuming now that the right hand key of a pair of keys associated with the same position control plunger has been depressed, i.e. one of the keys numbered III, VII, XI . . ., of corresponding pairs I/III, V/VII, IX/XI . . . the wiring diagrams shows that the energizing circuit of the slide solenoid 11 will then be broken, so that only the position control solenoid associated with the relative pair of keys, say I/III, will be energized. In the course of the rotary movement of the plunger disc 5 the selected position control plunger travelling in the direction of arrow 23 will therefore be intercepted by the base of recess 13 in stop 12, stopping the magnetic plunger disc 5 in this position since the magnetic stop S1 is not energized. On the other hand, if the left-hand key of a pair associated with the same plunger, i.e. one of the keys numbered I, V, IX etc. of corresponding pairs I/III, V/VII, IX/XI, is depressed, then solenoid 11 controlling stop S1 will be energised at the same time as the position control solenoid and rotation of the magnetic plunger disc 5 will therefore cause the position control plunger (identified for instance by a pair of odd Roman numerals) to be intercepted by the projecting face 14 of stop 12. The difference in the angular positions of the plunger disc determined by the position of the stop 12 corresponds with the pitch of the pins on the selector pin disc 3, as will be understood by reference to FIG. 1.

The rotary reciprocation of the magnetic plunger disc 5 is performed by an electric motor which turns the magnetic disc through the intermediary of a crank action and a flexible connecting rod (not shown). If the magnetic plunger disc is stopped by the interception of a plunger before having reached its maximum angular stroke (angular distance between neighbouring lettered push plungers) the crank motion will continue because the elastically flexible connecting rod can yield. At dead centre of the crank motion, irrespectively of the angle of interception of the magnetic plunger disc, the crank closes a switch *Sch*1 which causes the pre-selected lettered push plunger to operate.

On the other hand, the motor which imparts the rotary reciprocating motion to the magnetic plunger disc 5 will not be energised unless a numbered key has been depressed after the pre-selection of a lettered key. The depression of a numbered and a lettered key respectively closes switches *Sch*2 and *Sch*3, and thereby both a position control plunger as well as a pin operating push plunger are thereby selectively energized.

FIGS. 4 and 5 illustrate an embodiment of the key mechanism associated with the numbered keys. A key 24 of piano keyboard type is fulcrumed at 25. Its rearward extremity 36 is held by engagement with a vertically movable rail 26 urged by a spring 27 in the downward direction and hence retaining the key in inoperative position. This retaining rail 26 which runs across an entire group of juxtaposed numbered keys controls switch *Sch*2 which is held in open position by the tension spring 27 associated with the retaining rail 26 for as long as all the numbered keys are inoperative. Pivotally mounted on a shaft 29 is an L-section rail 30 which likewise extends across an entire group of numbered keys and which is retracted by a tension spring 31. The plunger 33 of a magnet M1 is in contact with a lever 34 affixed to said arrester rail 30.

When key 24 is depressed as indicated by arrow 35 the key will pivot on shaft 25 and its rear end 30 together with retaining rail 26 will swing upwards against the tension of the restoring spring 27. This action causes switch *Sch*2 to close. At the same time a change-over switch 28 will be operated, the centre spring 21 thereof relinquishing the break spring 20 and moving into contact with the relative make spring. The operation of relay R1 shown in FIG. 3 due to the closure of switch *Sch*2 energizes the arrester magnet M1 which propels its plunger 33 and swings the arrester rail 30 about its fulcrum 29 against the pull of its restoring spring 31 to the left in such manner that its upper flange will engage a recess 37 in the rear extremity 36 of the depressed key. It will be seen by reference to FIG. 4 that the deflection of the arrester rail 30 about its axis 29 simultaneously locks all the other numbered keys in the group and prevents them from being depressed and tilted about shaft 25 in the direction of arrow 35. The keys are not released for operation until magnet M1 is again de-energized and the restoring spring 31 can tilt the arrester rail 30 rearwards about its axis 29 and return it into the position illustrated in FIG. 4.

The selection of the desired records is preformed, according to the invention, in the manner that will now be described:

After insertion of a coin with the resultant closure of switch *Sch* K the person who wishes to use the machine selects a piece of music by reference to a table which gives him the selecting codes for each record. In the case in question let it be assumed that this is *b*/VII. At this stage the switches *Sch*1, *Sch*2 and *Sch*3 are still open.

By depressing key *b* the solenoid associated with plunger B is pre-selected. Owing to the action of the tension spring 18 acting on the arrester rail 17 as illustrated in FIG. 3 key *b* will remain in the depressed position. Since switch *Sch*1 still remains open the pre-selected solenoid of plunger B will not yet be energised. However, the arresting movement of rail 17 closes switch *Sch*3 for energising the keyboard comprising the keys marked with Roman numerals. The depression of key VII with the consequent operation of the associated change-over switch and the closure of switch 28, *Sch*2 interrupts the energising circuit of solenoid 11. On the other hand, the position control solenoid V/VII will be energized and the relative plunger propelled, whereas solenoid S1 remains inactive. As will be seen by reference to FIG. 1 the energised position control plunger is comprised in the inside bank of the group of position control plungers on the left and coordinates with the inner bank of pins on the selector pin disc 3 (see FIG. 2), representing odd numbers, and depending on the position of the magnetic stop 12 this plunger will be intercepted either by the base of the recess 15 or by the projecting face 16 of the stop.

The closure of switch *Sch*2 upon operation of key VII has at the same time energised relay R1 which controls both the arrester rail solenoid M1 as well as the starter switch of the motor (not shown) which reciprocates the magnetic plunger disc 5. The motor will therefore start turning this disc in the clockwise direction through the associated crank action and flexible connecting rod (not shown). The rotation of the magnetic plunger disc 5 will be stopped by the interception of the projecting plunger of solenoid V/VII as it travels in the direction of arrow 22 (FIG. 3) and strikes the base of recess 15 in slide 12. The resultant position of the plunger disc 5 will therefore be that symbolically represented by position 9′ in FIG. 2. In this position the several magnetic push plungers A . . . K will be in register with the selector pins coordinated with numeral VII. The crank case disc of the motor driving the magnetic plunger disc 5, which has continued its rotary movement whilst the flexible connecting rod yields, will now close switch *Sch*1 as it passes through its dead centre position so that the pre-selected solenoid of plunger B will be energised whilst the plunger disc remains stationary and propel its plunger which will therefore push pin *b*/VII through to the other side of the selector pin disc 3 where its projecting end can be later detected by the feeler element of the record magazine 2 which revolves quite independently of the selector mechanism. Magazine 2 will therefore stop in that position which corresponds with the position of pin *b*/VII, and the disc upon which the selected piece of music *b*/VII is recorded will be withdrawn from the magazine by an extracting mechanism (not shown) which also places the disc on to the turntable with the selected side facing the sound head.

Meanwhile the crank disc of the motor associated with the magnetic plunger disc continues its motion and returns the plunger disc 5 to its former position by means of the flexible connecting rod. At the end of this operation the crank mechanism briefly opens switch *Sch*4, de-energizing relay R1 and stopping the plunger disc motor. The release of relay R1 simultaneously de-energises the arrester rail solenoid M1, key VII snaps back into its inoperative position and switch *Sch*2 is re-opened. Moreover, a mechanism which is not shown, and which operates in the manner in which M1 cooperates with the numbered keys I to XX, releases the letter keys so that a fresh coin can be inserted, switch *Sch* K reclosed, and a further record selected.

When the selected record has been withdrawn from the magazine 2 a cancelling mechanism associated on the magazine with the detecting mechanism restores the projecting selector pin to its former position in the selector pin disc, thus permitting this particular record to be reselected if desired.

An embodiment of the detecting and cancelling mechanism proposed by the invention is illustrated in FIGS. 6 and 7.

Pivotally mounted on a pin 40 affixed to a bracket 38 on the revolving record magazine 2 is a switch lever 39. The upper extremity of this lever carries a roller 42 rotatably supported on a pin 41 and adapted to engage a cam face 52 on the spring contact 53 of a switch 54 when the switch lever 39 is pivotally tilted about its axis 40. The other offset arm of the tiltable switch lever 39 is fitted with a pivot pin 43 which extends perpendicularly to the switch lever axis 40 and carries two independently movable levers 44 and 45. Lever 44 which has a spade-like angular end operates as a feeler element for the detection of a pin projecting from the selector pin disc, whereas the other hammer-headed lever 45 is the cancelling element. Torsion springs which envelop pin 43 and which are symbolically represented by zig-zag-shaped arrows 46 and 47 urge the two levers 44 and 45 against stop members, not shown, into a "ready" position. The tilting switch lever 39 is urged into contact with a stop 56 by a spring 55.

The cancelling lever 45 has a strap-shaped angle-piece 57 which extends into the path of action of the thrust plunger 50 of a solenoid 51 in such manner that the plunger will be able to propel the cancelling lever 45 against a stop contrary to the pull of spring 46, irrespectively of the momentary position of the tiltable switch lever 39.

Coaxial with the revolving record magazine is the stationary selector pin disc 48 (disc 3 of FIG. 1), fitted, as has been described, with circularly arranged selector pins 49′, 49″, 49‴ (pins 4 of FIG. 1) which can be pushed forward in the direction of the magazine axis.

The detecting and cancelling action proceeds as follows:

Means that have been previously described push one of the selector pins, say pin 49, axially forward in such manner that the pin will project from the face of the selector pin disc 48 as shown in FIG. 6. The insertion of a coin causes the rotation of the record magazine 2 in the direction indicated by arrow 58 (FIG. 7). When the detector lever 44 strikes the projecting pin 49, switch lever 39 will be tilted about its pivot 40 in such manner that roller 42 will travel along the cam edge 52 on contact spring 53. When the roller reaches point 59 the spring contact pair 54 will be closed, operating a relay (not shown) which in turn causes the operating voltage of the magazine motor to be replaced by a D.C. braking voltage, thus abruptly stopping the magazine. The relay simultaneously starts the motor for operating the gripping mechanism which extracts the selected record from the magazine and places it into playing position. In the further course of the programme the braking voltage is removed from the motor and a switch is closed for energising the coil of the thrust magnet 51 which propels its plunger 50 and by its impact on the angular butt strap 57 pushes the cancelling lever 45 downward which in turn restores the selector pin 49 to its former inactive position. The air gap between the contact face of the detector lever 44 and the face of the cancelling lever 45 is preferred to be equal to about half the diameter of the selector pin 49 (distance "*r*" in FIG. 7).

It will be readily understood that two concentric banks of selector pins may be provided, one bank being coordinated with the top faces of the gramophone discs and the other with the rear faces. In such a case a separate detecting and cancelling mechanism of the above described kind will be associated with each bank of pins, the two mechanisms being constructed in homologic symmetry so that each one will coordinate with one direction of revolution. The detector and cancelling mechanism which happens not to be in use, and in relation to which the direction of revolution is in reverse, will then ride over projecting selector pins without deflecting the relative switch lever.

Apart from the features that have been described the mechanism offers the following further advantage:

Should the magazine and hence roller 42 on switch lever 39 move beyond the critical operating point 59, for instance as a result of failure of the D.C. braking voltage, switch 54 will at once reopen and the relay it controls will release. The record extracting mechanism which in such a case would not be in register with a record will therefore remain inoperative. The normal supply voltage will again be applied to the motor and the magazine will continue rotating. The switch lever 39 and its detecting lever 44 will be deflected by the selector pin 49 in the direction indicated by arrow 58 until the contact surface 44 has cleared the end of the projecting selector pin 49 on the stationary selector pin disc 48.

Should the failure of the braking D.C. prove to be permanent, then this action will repeat when contact is made with the next projecting selector pins and the magazine will eventually stop upon reaching its final position.

The described mechanisms ensure reliable cooperation between the disc extracting mechanism and the magazine, since the extracting mechanism can only work properly if the required angular position of the magazine is correct within a very limited angular tolerance.

Without further analysis, it will be obvious to those skilled in the art, upon a study of this disclosure, that this invention permits various modifications and alterations without omitting features that, from the standpoint of prior art, fairly constitute essential characteristics of the generic or specific aspects of this invention, and, therefore, such modifications and alterations are intended to be comprehended within the meaning, scope and range of equivalence of the following claims.

What we claim is:

1. In an automatic record playing machine, adapted to play a plurality of records, a record pre-selecting mechanism, comprising in combination, a shaft supported in said record playing machine, a magazine for storing said plurality of records rotatably supported on said shaft, a magnetic plunger disc pendulously suspended on said shaft, a selector pin disc rigidly secured to said shaft, pin means slidably supported in said selector pin disc, a plurality of magnetic plungers operatively supported on said magnetic plunger disc opposite said pin means, said plurality of magnetic plungers being adapted to be selectively connected to a source of electrical energy and when energized slidably move thereby said pin means, electric motor means operatively connected to said magnetic plunger disc for oscillating the latter about said shaft, and electric stop means operatively supported on said selector pin disc for selectively stopping the amplitude of the pendulum swing of said magnetic plunger disc about said shaft.

2. The record pre-selecting mechanism as set forth in claim 1, wherein said electrical stop means comprise two solenoids, rigidly secured at diametrically opposite locations to said selector pin disc, plunger means axially slidably supported in each of said two solenoids, said plunger means having at least two recesses and defining thereby at least four stop faces.

3. In an automatic record playing machine, adapted to play a plurality of records, a record pre-selecting mechanism, comprising in combination, a shaft supported in said record playing machine, a magazine for storing said plurality of records rotatably supported on said shaft, a magnetic plunger disc pendulously suspended about said shaft, a plurality of magnetically operable push plungers slidably supported in said magnetic plunger disc in at least one circular concentric arrangement, said plurality of magnetically operable push plungers being adapted to be selectively electro-magnetically projected by a source of electrical energy, a selector pin disc axially rigidly secured to said shaft between said magazine and said magnetic plunger disc, a plurality of selector pins slidably supported in said selector pin disc in two circular concentric arrangements opposite said circular arrangement of said plurality of magnetically operable push plungers, half the sum of the diameters of said two circular arrangements being equal to the diameter of the circular concentric arrangement of said plurality of magnetically operable push plungers, electric motor means operatively connected to said magnetic plunger disc for oscillating the latter about said shaft, and electric stop means secured to said selector pin disc at diametrically opposite locations and being adapted to be selectively connected to said source of electrical energy for selectively stopping the rotary movement of said magnetic plunger disc by moving said stop means into the rotary path of an associated one of said plurality of magnetically operable push plungers when said associated push plunger has been projected by said source of electrical energy.

4. The pre-selecting mechanism as set forth in claim 3, including a selector pin detecting and cancelling mechanism operatively connected to said magazine for storing said plurality of records, said detecting and cancelling mechanism being adapted to abuttingly detect one of said plurality of selector pins projected from said selector pin disc by one of said plurality of magnetically operable push plungers and restoring said selector pin to its non-projected inoperative position in said selector pin disc.

5. The pre-selecting mechanism as set forth in claim 4, wherein said selector pin detecting and cancelling mechanism comprises a stub shaft rigidly secured to said magazine, a member tiltably supported by said stub shaft, two levers pivotally connected to said tiltable member at one of its ends, said two levers being rotated with said magazine in a plane adjacent to said selector pin disc, second electric motor means operatively connected to said magazine for rotating said magazine about said shaft, and a fifth switch in the energizing circuit of said second electric motor means, said fifth switch cooperating with the other end of said tiltable member.

6. The pre-selecting mechanism as set forth in claim 5, including a relay in the energizing circuit of said second electric motor means, said relay disconnecting the power supply of said second electric motor means when said fifth switch is closed and applying a D.C. braking potential to said second electric motor means, said relay being connected to and thereby controlling the record extracting mechanism associated with said magazine.

7. The record pre-selecting mechanism as set forth in claim 3, wherein said electric stop means comprise two solenoids rigidly secured at diametrically opposite locations to said selector pin disc, plunger means axially slidably supported in each of said two solenoids, each of said plunger means having at least two recesses and defining thereby at least four stop faces, a number of said plurality of magnetically operable push plungers being arranged at diametrically opposite locations on said push plunger disc, each magnetically operable push plunger of said number of said plurality of magnetically operable push plungers when electromagnetically projected from said push plunger disc describing a circular arc when said push plunger disc oscillates about said shaft and thereby coming selectively into contact with one of two adjacent faces of said four stop faces of one of said plunger means.

8. In an automatic record playing machine, adapted to play a plurality of records, a record pre-selecting mechanism, comprising in combination, a shaft supported in said record playing machine, a magazine for storing said plurality of records rotatably supported on said shaft, a plunger disc pendulously suspended on said shaft, a plurality of electromagnetic plungers operatively supported on said plunger disc, a selector pin disc rigidly secured to said shaft, pin means slidably disposed in said selector pin disc opposite said plurality of electromagnetic plungers, two electromagnetic stop means operatively supported on said selector pin disc, electric motor means operatively connected to said magnetic plunger disc for oscillating the latter about said shaft, a plurality of manually operable key means operatively supported in said record playing machine, each key of a first set of keys of said plurality of key means being electrically connected to a plunger of a first set of plungers of said plurality of electromagnetic plungers, each key of a second set of keys of said plurality of key means being electrically connected to a plunger of a second set of plungers of said plurality of electromagnetic plungers, and each key of a third set of keys of said plurality of key means being electrically connected to a plunger of said second set of plungers of said plurality of electromagnetic plungers and to one stop means of said two electromagnetic stop means; whereby when a pair of said first and second set of keys are manually depressed a preselected plunger of said second set of plungers is electromagnetically projected, said plunger disc is swung about said shaft by said electric motor means until said projected plunger comes into abutting contact with one of said electromagnetic stop means which stops the amplitude of the swing of said plunger disc, and a preselected plunger of said first set of plungers is then electromagnetically projected thereby sliding a preselected pin of said pin means towards said magazine, and whereby when a pair of said first and third set of keys are manually depressed a preselected plunger of said second set of plungers and one stop means of said two electromagnetic stop means are electromagnetically projected, said plunger disc is swung about said shaft by said electric motor means until said projected plunger comes into abutting contact with said projected electromagnetic stop means which stops the amplitude of the swing of said plunger disc and a preselected plunger of said first set of plungers is then electromagnetically projected thereby sliding a preselected pin of said pin means towards said magazine.

9. The pre-selecting mechanism as set forth in claim 8, wherein said first set of plungers of said plurality of plungers is arranged on said plunger disc in a circular pattern, and said pin means are arranged in two circular concentric patterns on said selector pin disc opposite the circular pattern of said first set of plungers, half the sum of the diameters of said two circular patterns of said pin means being equal to the diameter of the circular pattern of said first set of plungers.

10. The pre-selecting mechanism as set forth in claim 8, including an energizing circuit electrically connected to said first, second and third set of keys of said plurality of manually operable key means and to said first and second set of plungers of said plurality of electromagnetic plungers and to said two electromagnetic stop means, and including a first arrester rail operatively connected to said first set of keys and a second arrester rail operatively connected to said second and third set of keys.

11. The pre-selecting mechanism as set forth in claim 10, including a crank disc and flexible yieldable connecting rod operatively connected to said electric motor means and said magnetic plunger disc for reciprocating said plunger disc about said shaft.

12. The pre-selecting mechanism as set forth in claim 11, including a first arrester rail operatively connected to said first set of keys, a second rail operatively connected to said second and third set of keys, a first switch in said energizing circuit, said first switch cooperating with said first arrester rail, a second switch in said energizing circuit, said second switch cooperating with said crank disc and flexible connecting rod when the latter is in its dead center position, and a third switch in said energizing circuit, said third switch cooperating with said second rail, and a fourth switch in said energizing circuit, said fourth switch being electrically connected to said electric motor means, said fourth switch being adapted to be briefly opened by said crank disc and flexible yieldable connecting rod when the latter has completed its return stroke thereby interrupting the energizing circuit to said electric motor means.

13. The pre-selecting mechanism as set forth in claim 12, including at least one additional spring biased L-shaped arrester rail extending along said second and third set of keys said plurality of key means and in abutting contact with the recessed rear portion thereof, said L-shaped arrester rail and said first arrester rail being respectively pivotally supported on an axis extending parallely to said first and to said second and third set of keys of said plurality of keys, said L-shaped arrester rail and first arrester rail being respectively adapted to be pivoted about their axes by an electro-magnetic stop means in the energizing circuit of said plurality of magnetically operable push plungers.

14. The pre-selecting mechanism as set forth in claim 13, wherein said first arrester rail and said L-shaped arrester rails include locking means cooperating respectively with said first, second and third set of key means for respectively locking all the nondepressed keys thereof in their non-depressed position when one key thereof has been manually depressed.

15. The pre-selecting mechanism as set forth in claim 14, including first and second electric unlocking means respectively cooperatively connected to said first arrester rail and said L-shaped arrester rail for unlocking the same when the operation of selection has been completed.

References Cited in the file of this patent

UNITED STATES PATENTS

| | | |
|---|---|---|
| 2,416,436 | Eakins | Feb. 25, 1947 |
| 2,716,550 | Jensen | Aug. 30, 1955 |
| 2,850,285 | Vanderzee | Sept. 2, 1958 |
| 2,865,638 | Acker | Dec. 23, 1958 |
| 2,906,538 | Rockola | Sept. 29, 1959 |
| 2,937,026 | Acker | May 17, 1960 |

FOREIGN PATENTS

| | | |
|---|---|---|
| 746,116 | Great Britain | Mar. 7, 1956 |